Patented Oct. 9, 1934

1,975,830

UNITED STATES PATENT OFFICE 1,975,830

AZO DYESTUFF AND METHOD FOR ITS PREPARATION

Miles Augustinus Dahlen, Wilmington, Del., assignor to E. I. du Pont de Nemours & Company, Wilmington, Del., a corporation of Delaware No Drawing. Application June 30, 1932, Serial No. 620,286

14 Claims. (Cl. 260—95)

This invention relates to new azo dyes and more particularly refers to azo dyes which are insoluble in water and yield valuable pigment dyes or fast dyeings or printings when prepared on the fiber.

It is an object of this invention to prepare azo dyes which may be used either as insoluble pigment colors or as dyes developed on the fiber. It is a further object of this invention to produce dyes of good fastness to washing and light. Additional objects will appear hereinafter.

These objects are attained by the process of the present invention wherein an arylamide of beta-hydroxy-naphthoic acid having the following general formula:

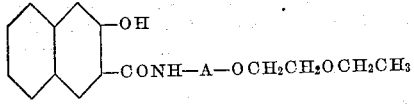

in which A represents a benzene nucleus, is coupled to a diazotized aromatic amine, free from any group rendering the dyestuff water soluble.

The invention will be more completely understood by reference to the following examples, in which the quantities are stated in parts by weight:

Example 1

Cotton yarn, after being well-boiled and dried, was impregnated thoroughly with an aqueous padding liquor containing in one liter: 10 parts of the 2,3-hydroxy-naphthoyl derivative of the beta-ethoxy-ethyl-ether of para-amino-phenol, 20 parts of caustic soda of 40% strength, and 20 parts of Turkey red oil. The treated yarn was then wrung as dry as possible, and developed without further drying in a diazo solution prepared as follows:

10 parts of 5-nitro-2-amino-anisole were dissolved in a mixture of 15 parts of hydrochloric acid of 22° Bé. and 100 parts of boiling water. 160 parts of ice were added; and after cooling to about 10° C., 25 parts of a solution of sodium nitrite of 20% strength were added. When diazotization was complete, the solution was made neutral to Congo red paper by the addition of the necessary quantity of sodium acetate (about 25 parts).

After development of the dyestuff in the above bath was completed, the yarn was rinsed, then soaped in boiling water. Upon further rinsing and drying, a bright bluish-red dyestuff of very good fastness to light and boiling water was obtained. It had the probable formula:

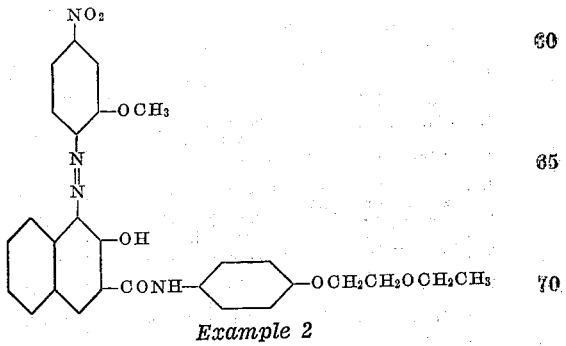

Example 2

Cotton yarn, which had been well-boiled and dried, was impregnated with a padding solution containing in one liter: 10 parts of the 2,3-hydroxy-naphthoyl derivative of the beta-ethoxy-ethyl-ether of 4-chloro-2-amino-phenol, 20 parts of Turkey red oil and 10 parts of caustic soda solution of 40% strength. The impregnated yarn was then wrung out as dry as possible and developed with a diazo solution prepared as follows:

13 parts of meta-chloro-aniline were dissolved in 200 parts of hot water containing 24 parts of hydrochloric acid of 22° Bé. strength. The solution was cooled, 150 parts of ice added, and the base diazotized by the addition of a solution of 8 parts of sodium nitrite in 50 parts of water. When diazotization was complete, the solution was made neutral to Congo red paper by the addition of sodium acetate as required.

When development of the dyestuff in the above diazo-solution was complete, the yarn was rinsed, soaped in hot water, again rinsed and dried. The resulting orange dyestuff showed good fastness to light and washing, and probably had the formula:

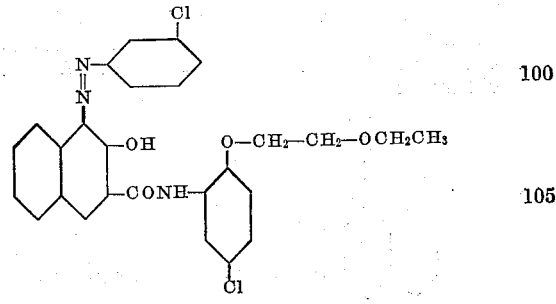

As will be readily understood, the number of dyestuffs and pigments which can be prepared according to the present invention is very large. The following table cites a few representative examples, and includes a description of the shades produced on cotton materials:

| Example No. | Developed with the diazo from— | Combined with the 2-3-hydroxy naphthoyl derivative of the beta-ethoxy-ethyl-ether of— | Shade |
|---|---|---|---|
| 3 | Meta-chloro-aniline | Ortho-amino-phenol | Orange. |
| 4 | 5-nitro-2-amino-anisole | do | Red. |
| 5 | 2,5-dichloro-aniline | do | Scarlet. |
| 6 | 1-amino-4-benzoyl-amino-2,5-dimethoxy-benzene. | do | Blue. |
| 7 | 2-nitro-4-chloro-aniline. | 4-chloro-2-amino-phenol. | Red. |
| 8 | 5-nitro-2-amino-anisole | do | Do. |
| 9 | 1-amino-4-benzoyl-amino-2,5-dimethoxy-benzene. | do | Blue. |
| 10 | 3-amino-carbazole | do | Purple. |
| 11 | 4-nitro-2-amino-anisole. | Para-amino-phenol | Scarlet. |
| 12 | 1-amino-4-benzoyl-amino-2,5-dimethoxy-benzene. | do | Blue. |
| 13 | 2-nitro-4-chloro-aniline. | do | Red. |
| 14 | Meta-chloro-aniline | do | Orange. |
| 15 | Alpha-naphthylamine | do | Bordeaux. |
| 16 | Alpha-amino-anthraquinone. | do | Red. |
| 17 | Dianisidine | 3-amino-4-hydroxy-toluene. | Blue. |
| 18 | 4-benzoylamino-6-amino-meta-xylene. | do | Red. |
| 19 | 2-nitro-4-methyl-benzene azo-cresidine. | do | Corinth. |
| 20 | 2,5-dichloro-aniline | 4-methoxy-2-amino-phenol. | Scarlet. |
| 21 | Meta-nitro-para-toluidine. | do | Red. |
| 22 | Meta-nitraniline | 2,5-dimethyl-4-amino-phenol. | Scarlet. |
| 23 | 4,4′-diamino-diphenylamine. | Meta-amino-phenol | Blue-black. |

The arylamides of beta-hydroxy-naphthoic acid used in the preparation of the dyestuffs described in this application may be prepared by the condensation of bases of the general formula:

$$NH_2—A—OCH_2CH_2OCH_2CH_3$$

with beta-hydroxy-naphthoic acid, by processes such as those described in copending application No. 438,913, filed March 25, 1930. Bases corresponding to the general formula:

$$NH_2—A—OCH_2CH_2OCH_2CH_3$$

may be prepared by the following general procedure:

An alkali metal salt of a nitro-phenol $$(Me—O—A—NO_2)$$

was condensed with a beta-halogenated diethyl-ether $(Hal—CH_2CH_2—O—CH_2CH_3)$ to give a beta-ethoxy-ethyl-ether of the nitro-phenol $(NO_2—A—OCH_2CH_2OCH_2CH_3)$, which was then reduced to the amino compound $$(NH_2—A—OCH_2CH_2OCH_2CH_3).$$

Upon coupling the arylamide of beta-hydroxy-naphthoic acid with a diazotized aromatic amine a compound of the following general formula is obtained:

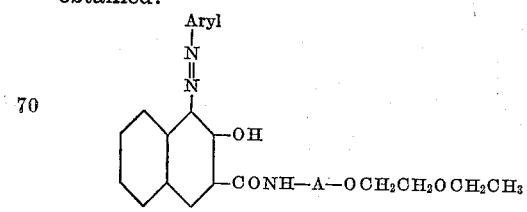

in which Aryl represents an aryl nucleus of the benzene, naphthalene, diphenyl, diphenylamine, azobenzene, anthraquinone or carbazole series which contains no group, such as the sulfonic acid or carboxylic acid group, which would render the dyestuff water soluble, but which may contain groups such as alkyl, alkoxy, halogen, nitro, and benzoyl-amino; and A represents a benzene nucleus which may have groups substituted thereon such as halogen, alkyl, or alkoxy. Coupling of the arylamides of beta-hydroxynaphthoic acid may take place either in aqueous solution, in suspension or on the fiber.

The dyes produced by the process of the present invention compare favorably with the dyes formerly prepared from arylamides of beta-hydroxy-naphthoic acid, as regards fastness to washing, light, chlorine, and soaping. Beautiful colors which are in great demand are produced.

As many apparently widely different embodiments of this invention may be made without departing from the spirit and scope thereof, it is to be understood that I do not limit myself to the specific embodiments thereof except as defined in the appended claims.

I claim:

1. A process for producing a water insoluble azo dye which comprises coupling an arylamide of beta hydroxy-naphthoic acid having the following general formula:

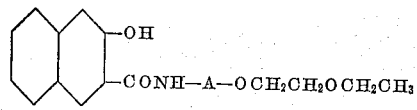

in which A represents a benzene nucleus, with a diazotized aromatic amine.

2. A process for producing a water insoluble azo dye which comprises coupling an arylamide of beta hydroxy-naphthoic acid having the following general formula:

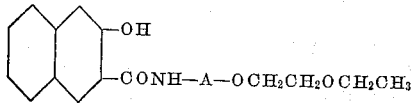

in which A represents a benzene nucleus which may have substituted thereon members selected from the group consisting of halogen, alkyl, and alkoxy; with a diazotized aromatic amine selected from the group consisting of benzene, naphthalene, diphenyl, diphenylamine, azobenzene, anthraquinone and carbazole, which may have substituted thereon members selected from the group consisting of alkyl, alkoxy, halogen, nitro and benzoylamino.

3. A process for producing a water insoluble azo dye which comprises coupling an arylamide of beta-hydroxy-naphthoic acid having the following general formula:

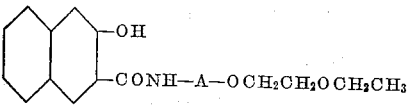

in which A represents a benzene nucleus which may have substituted thereon members selected from the group consisting of halogen, alkyl, and alkoxy; with a diazotized aromatic amine of the benzene series which may have substituted thereon members selected from the group consisting of alkyl, alkoxy, halogen, nitro and benzoyl-amino.

4. A process for producing an azo dye which comprises coupling the 2,3-hydroxy-naphthoyl derivative of the beta-ethoxy-ethyl-ether of paraamino-phenol with diazotized 5-nitro-2-amino-anisole.

5. A process for producing an azo dye which comprises coupling the 2,3-hydroxy-naphthoyl derivative of the beta-ethoxy-ethyl-ether of 4-chloro-2-amino-phenol with diazotized meta-chloro-aniline.

6. A process for producing an azo dye which comprises coupling the 2,3-hydroxy-naphthoyl derivative of the beta-ethoxy-ethyl-ether of para-amino-phenol with diazotized 4-nitro-2-amino-anisole.

7. A water insoluble azo dye having the general formula:

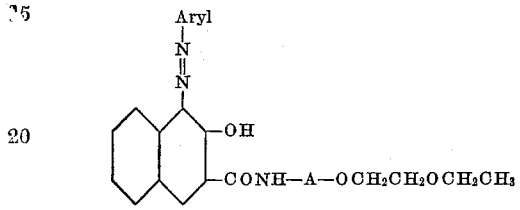

in which Aryl represents an aromatic nucleus, and A represents a benzene nucleus.

8. A water insoluble azo dye having the general formula:

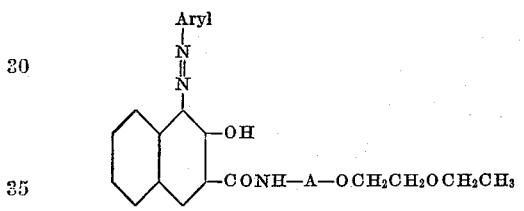

in which Aryl represents an aryl nucleus selected from the group consisting of benzene, diphenyl, diphenylamine, naphthalene, azobenzene, anthraquinone, and carbazole, which may have substituted thereon members selected from the group consisting of alkyl, alkoxy, halogen, nitro, and benzoyl-amino, and in which A represents a benzene nucleus which may have substituted thereon members selected from the group consisting of halogen, alkyl, and alkoxy.

9. A water insoluble azo dye having the following general formula:

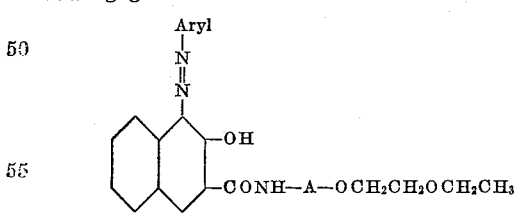

in which Aryl represents an aromatic nucleus of the benzene series which may have substituted thereon members selected from the group consisting of alkyl, alkoxy, halogen, nitro and benzoyl-amino, and in which A represents a benzene nucleus which may have substituted thereon members selected from the group consisting of halogen, alkyl and alkoxy.

10. An azo dye having the formula:

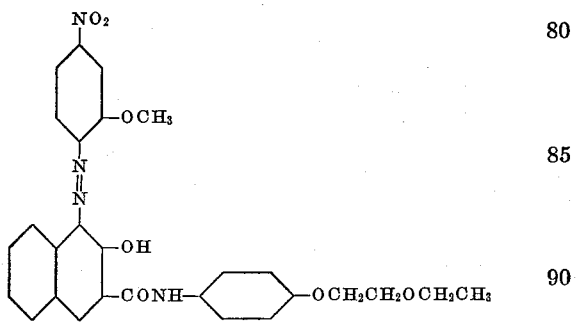

11. An azo dye having the formula:

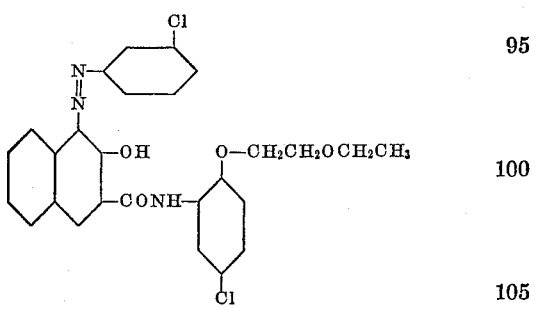

12. An azo dye having the formula:

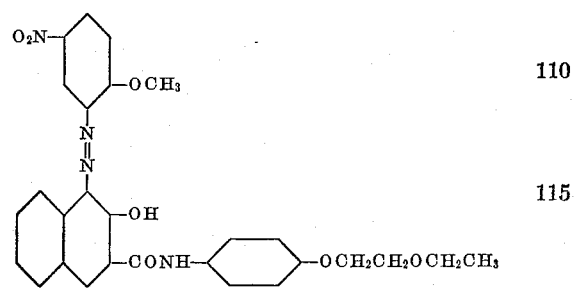

13. An azo dye containing the grouping:

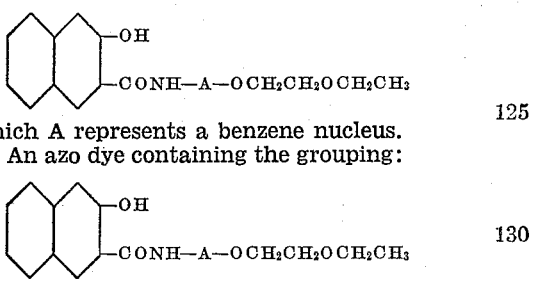

in which A represents a benzene nucleus.

14. An azo dye containing the grouping:

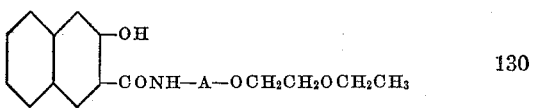

in which A represents a benzene nucleus which may have substituted thereon members selected from the group consisting of halogen, alkyl and alkoxy.

MILES AUGUSTINUS DAHLEN.